US008942299B2

(12) United States Patent
Lin et al.

(10) Patent No.: US 8,942,299 B2
(45) Date of Patent: Jan. 27, 2015

(54) BASEBAND BEAMFORMING

(75) Inventors: Saihua Lin, Sunnyvale, CA (US); Roger Brockenbrough, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/406,242

(22) Filed: Feb. 27, 2012

(65) Prior Publication Data

US 2013/0223486 A1 Aug. 29, 2013

(51) Int. Cl.
*H04B 1/38* (2006.01)

(52) U.S. Cl.
USPC .......................................................... 375/259

(58) Field of Classification Search
USPC .......................................................... 375/259
See application file for complete search history.

(56) References Cited

U.S. PATENT DOCUMENTS

| | | | |
|---|---|---|---|
| 4,638,269 A | 1/1987 | Dawson et al. | |
| 5,228,006 A | 7/1993 | Sheriff | |
| 5,548,561 A | 8/1996 | Hussain et al. | |
| 7,760,833 B1 | 7/2010 | Brunner | |
| 7,812,775 B2 | 10/2010 | Babakhani et al. | |
| 7,915,941 B1 | 3/2011 | Pan et al. | |
| 7,917,091 B2 | 3/2011 | Montemayor et al. | |
| 7,961,025 B2 | 6/2011 | Rylov | |
| 7,990,298 B1 | 8/2011 | Friedmann et al. | |
| 2005/0147194 A1 | 7/2005 | Koenenkamp | |
| 2007/0160168 A1 | 7/2007 | Beukema et al. | |
| 2008/0164917 A1 * | 7/2008 | Floyd et al. | 327/117 |
| 2009/0310712 A1 | 12/2009 | Nakatani | |
| 2010/0026367 A1 | 2/2010 | Jiang | |
| 2010/0029223 A1 | 2/2010 | Tang et al. | |
| 2010/0329403 A1 | 12/2010 | Beukema et al. | |
| 2011/0076944 A1 | 3/2011 | Mihota | |
| 2012/0013388 A1 * | 1/2012 | Couzin | 327/355 |
| 2013/0093624 A1 * | 4/2013 | Raczkowski et al. | 342/368 |
| 2013/0222183 A1 | 8/2013 | Lin | |

FOREIGN PATENT DOCUMENTS

| | | | |
|---|---|---|---|
| JP | 2007150646 | A | 6/2007 |
| WO | 0184702 | A2 | 11/2001 |

OTHER PUBLICATIONS

Afsahi, et al., "An Area and Power Efficient Cartesian Phase Shifter + Mixer Circuit Applied to WLAN System," 2007 IEEE Radio Frequency Integrated Circuits (FRIC) Symposium, pp. 357-360.
Sjöland. "From sub-VT RF to mm-wave CMOS Circuits". [Online] 2010. http://cdworkshop.eit.lth.se/fileadmin/cdworkshop/2010/Sjoland-RF.pdf (accessed Aug. 17, 2011). See pp. 14-16.
Tabesh, et al., "A 65nm CMOS 4-Element Sub-34mW/Element 60GHz Phased-Array Transceiver," 2011 IEEE International Solid-State Circuits Conference Digest of Technical Papers, ISSCC 2011, pp. 166-168.

(Continued)

*Primary Examiner* — Michael Neff

(57) ABSTRACT

Exemplary embodiments are directed to beamforming. A device may include a plurality of inputs for receiving differential in-phase and quadrature data. The device may further include a plurality of switching elements coupled to the plurality of inputs and configured to enable for rotation of the differential in-phase and quadrature data at baseband.

25 Claims, 13 Drawing Sheets

(56) References Cited

OTHER PUBLICATIONS

Aerts W. et al., "Conceptual Study of Analog Baseband Beam Forming: Design and Measurement of an Eight-by-Eight Phased Array", IEEE Transactions on Antennas and Propagation, Jun. 1, 2009, IEEE Service Center, Piscataway, NJ, US, vol. 57, No. 6, pp. 1667-1672, XP011261762, ISSN: 0018-926X.

Cohen, et al., "A thirty two element phased-array transceiver at 60GHz with RF-IF conversion block in 90nm flip chip CMOS process," 2010 IEEE Radio Frequency Integrated Circuits Symposium (RFIC), 2010, pp. 457-460.

International Search Report and Written Opinion—PCT/US2013/028100—ISA/EPO—Jun. 3, 2013.

Mesecher D K: "A physical layer open architecture for communications systems integration: Common baseband processor with multiple-access adaptively steered antenna array", Systems, Applications and Technology Conference, 2008 IEEE Long Island, IEEE, Piscataway, NJ, USA, May 2, 2008, pp. 1-10, XP031344947, ISBN: 978-1-4244-1731-5.

Natarajan et al. "A 77-GHz Phased-Array Transceiver with On-Chip Antennas in Silicon: Transmitter and Local LO-Path Phase Shifting". IEEE Journal of Solid-State Circuits [Online] 2006, vol. 41, Issue 12, pp. 2807-2819. See pp. 2807, 2810, and 2813.

Valdes-Garcia, et al., "A Fully Integrated 16-Element Phased-Array Transmitter in SiGe BiCMOS for 60-GHz Communications," IEEE Journal of Solid-State Circuits, vol. 45, No. 12, Dec. 2010, pp. 2757-2773.

* cited by examiner

BASEBAND BEAMFORMING

REFERENCE TO CO-PENDING APPLICATIONS FOR PATENT

This application is also related to the following application, which is assigned to the assignee hereof and filed on even date herewith, the disclosure of which is incorporated herein in its entirety by reference:

U.S. patent application Ser. No. 13/406,282, entitled "RF BASEBAND BEAMFORMING", filed simultaneously with this application on Feb. 27, 2012.

BACKGROUND

1. Field

The present invention relates generally to beamforming. More specifically, the present invention relates to systems, devices, and methods for baseband beamforming in millimeter wave applications.

2. Background

As will be appreciated by a person having ordinary skill in the art, beamforming in millimeter wave applications presents many challenges. As one example, a 60 GHz signal may have approximately 20 dB more loss than a 2.4 GHz signal at a distance of approximately one meter. One solution to the problem of loss may include increasing an output power of a power amplifier. However, this solution may be limited by a low supply voltage, a low breakdown voltage, a lossy substrate, low-Q passive components, and the low intrinsic gain of CMOS transistors.

A need exists for methods, systems, and devices to enhance beamforming in millimeter wave applications.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

As will be understood by a person having ordinary skill in the art, in conventional point-to-point communication, a large amount of energy may be wasted when utilizing a one antenna solution. Accordingly, various array architectures (i.e., an array of antennas), which may focus energy in a spatial domain, are well known in the art.

Figure 1:
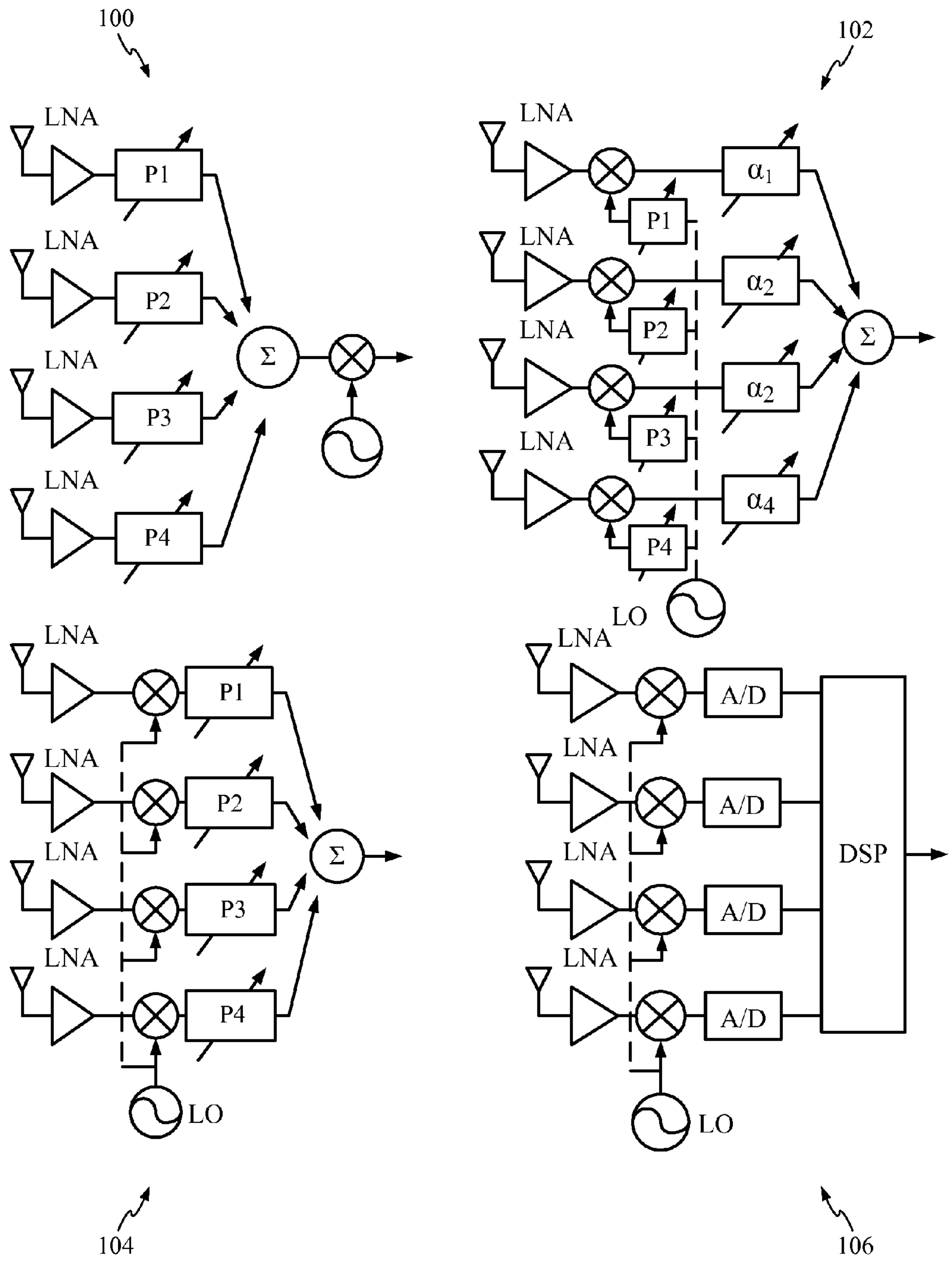
FIG. 1 depicts various beamforming array architectures.

FIG. 1 illustrates various beamforming array architectures. Although FIG. 1 illustrates various receiver-based beamforming array architectures, one having ordinary skill will understand transmitter-based beamforming array architectures. Specifically, reference numeral 100 indicates a radio frequency (RF) path beamforming architecture, reference numeral 102 indicates a local oscillator (LO) path beamforming architecture, reference numeral 104 indicates an intermediate frequency (IF) path beamforming architecture, and reference numeral 106 indicates a digital domain architecture.

As will be understood, RF path beamforming may utilize a small area and low power. Further, RF path beamforming may exhibit a good signal-to-noise ratio (SNR) and a good signal to interference-plus-noise ratio (SINR). However, challenges of RF path beamforming include designing for a high linearity, wide band, low loss, and low-area RF phase shifter. Further, LO path beamforming may exhibit low sensitivity to LO amplitude variations. On the other hand, challenges of LO path beamforming include design of a large LO network, and it may be difficult to generate a millimeter wave LO signal. IF path beamforming may exhibit good linearity and may utilize a low power phase shifter. However, IF path beamforming includes less component sharing and a large LO network. Further, offset calibration may be difficult to multiple mixers. Additionally, although a digital domain architecture may be versatile, it may require a fast digital signal processor and may exhibit high power consumption.

As will be understood by a person having ordinary skill in the art, for analog baseband beamforming:

$$\begin{bmatrix} I' \\ Q' \end{bmatrix} = \begin{bmatrix} \cos\omega_c t & 0 \\ 0 & \sin\omega_c t \end{bmatrix} \begin{bmatrix} \cos\theta & -\sin\theta \\ \sin\theta & \cos\theta \end{bmatrix} \begin{bmatrix} I \\ Q \end{bmatrix}; \tag{1}$$

$$I' = \cos\omega_c t[\cos\theta \quad -\sin\theta] \begin{bmatrix} I \\ Q \end{bmatrix}; \tag{2}$$

and $$Q' = \sin\omega_c t[\sin\theta \quad \cos\theta] \begin{bmatrix} I \\ Q \end{bmatrix}. \tag{3}$$

Further, for RF baseband beamforming:

$$\begin{bmatrix} I' \\ Q' \end{bmatrix} = \text{diag}\left\{ \begin{bmatrix} \cos\theta & -\sin\theta \\ \sin\theta & \cos\theta \end{bmatrix} \begin{bmatrix} I \\ Q \end{bmatrix} [\cos\omega_c t \quad \sin\omega_c t] \right\}; \tag{4}$$

$$I' = \cos\omega_c t[\cos\theta \quad -\sin\theta] \begin{bmatrix} I \\ Q \end{bmatrix}; \tag{5}$$

and $$Q' = \sin\omega_c t[\sin\theta \quad \cos\theta] \begin{bmatrix} I \\ Q \end{bmatrix}. \tag{6}$$

Further, an output signal "$\text{Signal}_{Tx,out}$," which is the same for both baseband and RF, is equal to I'+Q'. Accordingly, as will be appreciated by a person having ordinary skill in the art, analog baseband beamforming and RF baseband beamforming each utilize baseband beamforming techniques and, thus, analog baseband beamforming generates substantially the same output when compared to RF baseband beamforming.

Exemplary embodiments of the present invention include devices, systems, and methods for receiver-based baseband beamforming. In contrast to conventional beamforming wherein a carrier signal may be shifted, exemplary embodiments may provide for beamforming wherein a baseband signal (i.e., an envelope signal) is shifted.

Figure 2A:
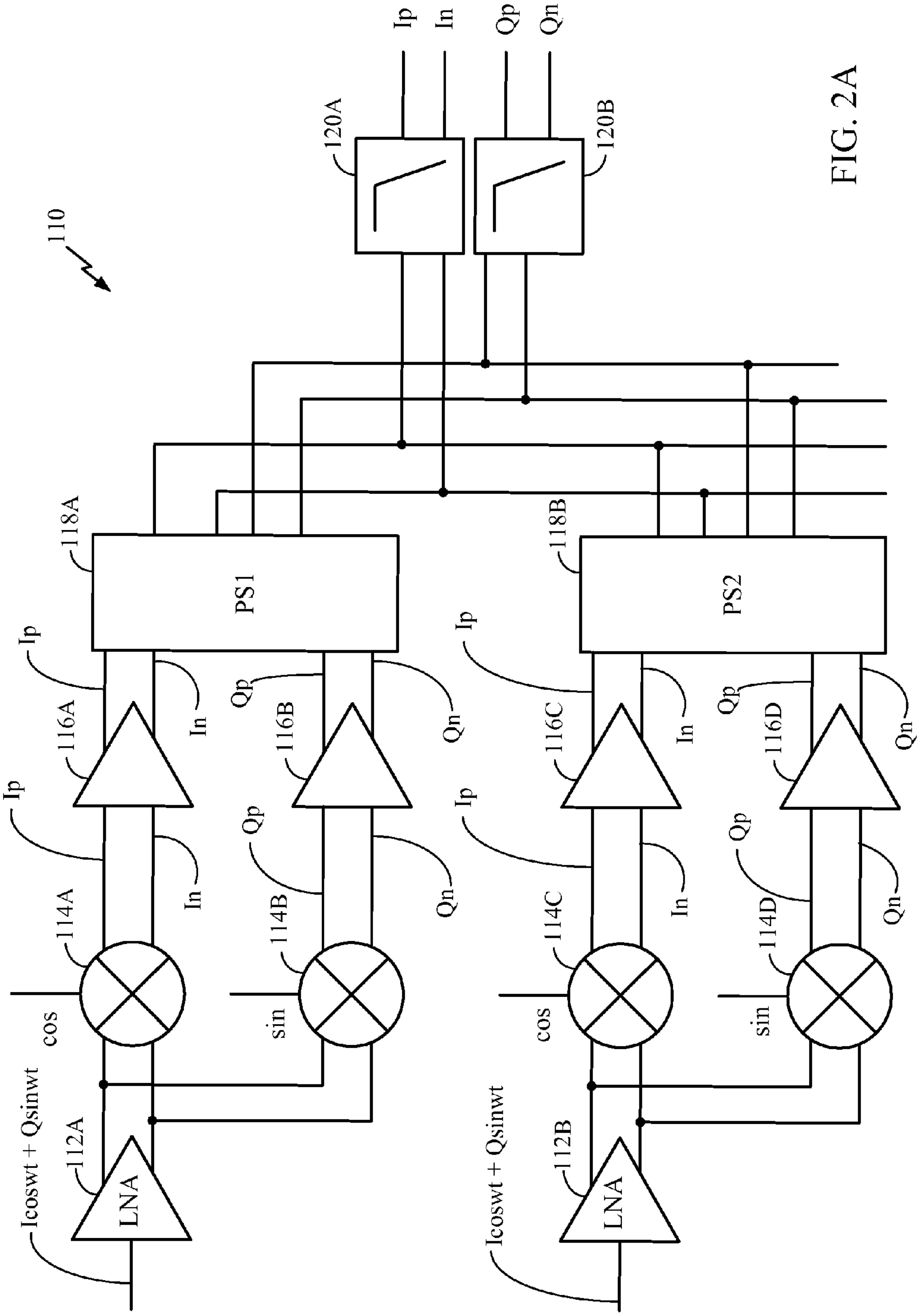
FIG. 2A illustrates a device including one or more phase rotators, according to an exemplary embodiment of the present invention.

FIG. 2A illustrates a device 110, in accordance with an exemplary embodiment of the present invention. Device 110, which is configured for directional signal transmission (i.e., beamforming), includes two low-noise amplifiers 112, four mixers 114, four driver amplifiers 116, two phase shifters 118, and two filters 120. More specifically, in the exemplary embodiment illustrated in FIG. 2A, device 110 includes LNAs 112A and 112B, mixers 114A-114D, driver amplifiers 116A-116D, phase shifters 118A and 118B, and filters 120A and 120B. It is noted that device 110 includes two antenna branches (i.e., each LNA 112A and 112B being associated with an antenna branch). It is noted that, in accordance with an exemplary embodiment of the present invention, device 110 may require two mixers per antenna branch. For example, if eight antenna branches are utilized, sixteen mixers may be required. It is noted that phase shifters 118A and 118B may each comprise one of the phase shifters described below (i.e., phase shifter 150, phase shifter 180, phase shifter 200, phase shifter 250, phase shifter 300, phase shifter 350, or phase shifter 400). As will be appreciated by a person having ordinary skill in the art, according to an exemplary embodiment of the present invention, in-phase and quadrature (I/Q) data may be rotated (i.e., multiplied by a rotation matrix) prior to being multiplied by a carrier signal.

During a contemplated operation of device 150, a signal (i.e., I cos ωt+Q sin ωt) is conveyed to each of LNA112A and 112B. Further, a signal is conveyed to an associated mixer (i.e., mixer 114A-D) and then to an associated driver amplifier (i.e., driver amplifier 116A-H). More specifically, signal Ip cos ωt+Qp sin ωt is mixed with a cosine wave at each of mixer 114A at mixer 114C to generate signal Ip and a sine wave at each of mixer 114B and mixer 114D to generate signal Qp. Further, signal In cos ωt+Qn sin ωt is mixed with a cosine wave at each of mixer 114A and mixer 114C to generate signal In and a sine wave at each of mixer 114B and mixer 114D to generate Qn.

Moreover, signals Ip and In may be conveyed to driver amplifiers 116A and 116C, and signals Qp and Qn may be conveyed to driver amplifiers 116B and 116D. Further, the outputs of each driver amplifier 116 are conveyed to a phase shifter (i.e., either phase shifter 118A or phase shifter 118B). After processing the received signals, as will be described in more detail below, each of phase shifter 118A and phase shifter 118B may output rotated in-phase signals (i.e., I'p and I'n) to filter 120A and rotated quadrature signals (i.e., Q'p and Q'n) to filter 120B.

As will be understood by a person having ordinary skill in the art, a rotation matrix and phase rotation may be defined as:

$$R = \begin{bmatrix} \cos\theta & -\sin\theta \\ \sin\theta & \cos\theta \end{bmatrix}; \tag{7}$$

and $$\begin{bmatrix} I' \\ Q' \end{bmatrix} = \begin{bmatrix} \cos\theta & -\sin\theta \\ \sin\theta & \cos\theta \end{bmatrix} \begin{bmatrix} I \\ Q \end{bmatrix}; \tag{8}$$

wherein I and Q represent in-phase and a quadrature data and I' and Q' represent rotated in-phase and quadrature data.

Figure 2B:
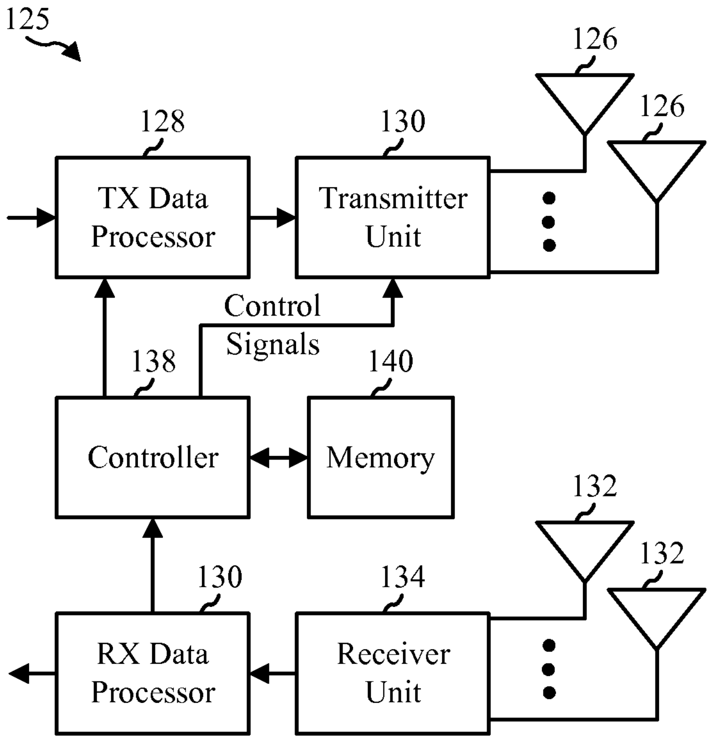
FIG. 2B illustrates a device including a transmitter unit and a receiver unit, in accordance with an exemplary embodiment of the present invention.

FIG. 2B shows a block diagram of an embodiment of a device 125. Device 125 may include one or more antennas 126. During signal transmission, a transmit (TX) data processor 128 receives and processes data and generates one or more streams of data. The processing by TX data processor 128 is system dependent and may include, e.g., encoding, interleaving, symbol mapping, and so on. For a CDMA system, the processing typically further includes channelization and spectral spreading. TX data processor 128 also converts each stream of data into a corresponding analog baseband signal. A transmitter unit 130 receives and conditions (e.g., amplifies, filters, and frequency upconverts) the baseband signals from TX data processor 128 and generates an RF output signal for each antenna used for data transmission. The RF output signals are transmitted via antennas 126. During signal reception, one or more signals may be received by antennas 132, conditioned and digitized by a receiver unit 134, and processed by an RX data processor 136. Controller 138 may direct the operation of various processing units within device 125. Further, memory units 140 may store data and program codes for controllers 138. It is noted that receiver unit 134 may include device 110, which is illustrated in FIG. 2A.

Figure 3B:
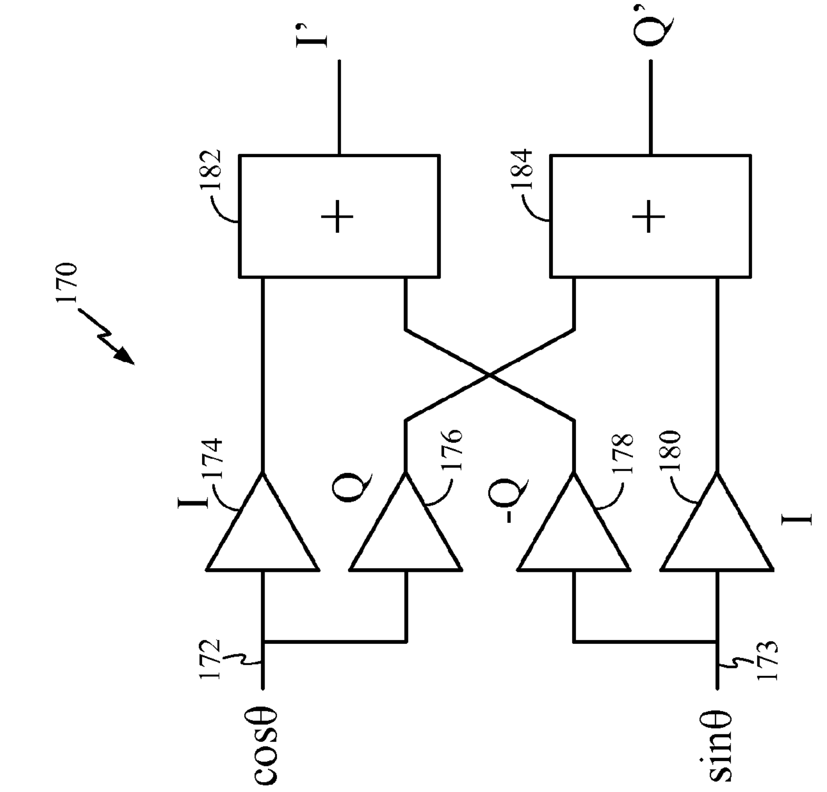
FIGS. 3A and 3B illustrate various phase shifter implementations, according to exemplary embodiments of the present invention.
Figure 3A:
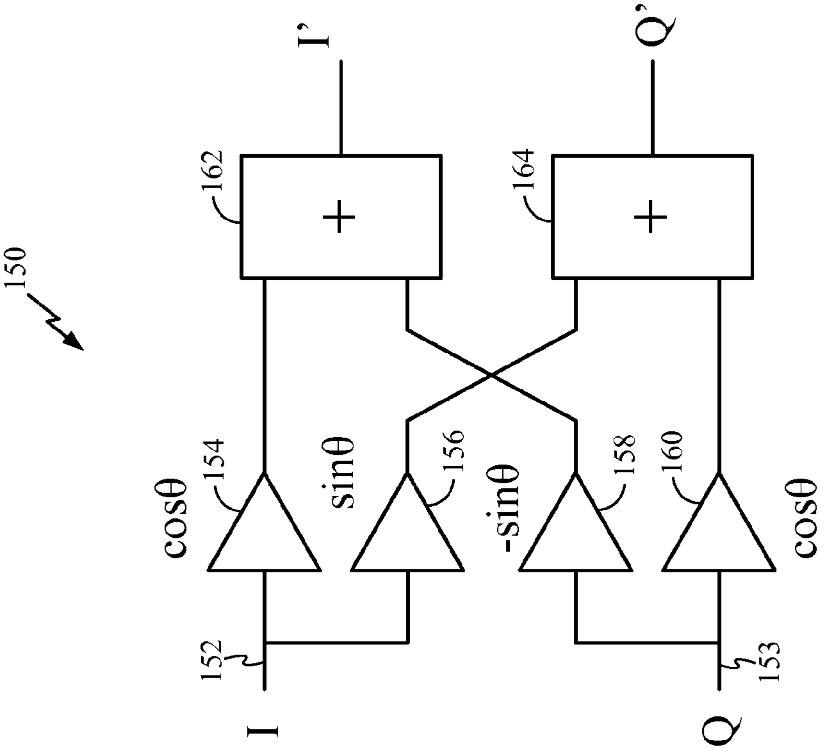

FIG. 3A is a block diagram depicting a circuit 150, according to one exemplary embodiment of the present invention. Circuit 150 includes I and Q inputs 152 and 153, amplifiers 154 and 156 coupled to I input 152, and amplifiers 158 and 160 coupled to Q input 154. Further, circuit 150 includes adders 162 and 164, wherein adder 162 is configured to receive an output from amplifiers 154 and 158 and adder 164 is configured to receive an output from amplifiers 156 and 160. Adders 162 and 164 are configured to output I' and Q', respectively. According to one exemplary embodiment, amplifiers 154 and 160 are configured to have a gain of cos θ, amplifier 156 is configured to have a gain of sin θ, and amplifier 158 is configured to have a gain of −sin θ.

FIG. 3B is a block diagram depicting a circuit 170, according to another exemplary embodiment of the present invention. Circuit 170 includes inputs 172 and 173, which are configured to receive signals cos θ and sin θ, respectively. Further, circuit 170 includes amplifiers 174 and 176 coupled to input 172, and amplifiers 178 and 180 coupled to input 173. Further, circuit 170 includes adders 182 and 184, wherein adder 182 is configured to receive an output from amplifiers 174 and 178 and adder 184 is configured to receive an output from amplifiers 176 and 180. Adders 182 and 184 are configured to output I' and Q', respectively. According to one exemplary embodiment, amplifiers 174 and 180 are configured to have a gain of I, amplifier 176 is configured to have a gain of Q, and amplifier 178 is configured to have a gain of −Q.

Figure 4:
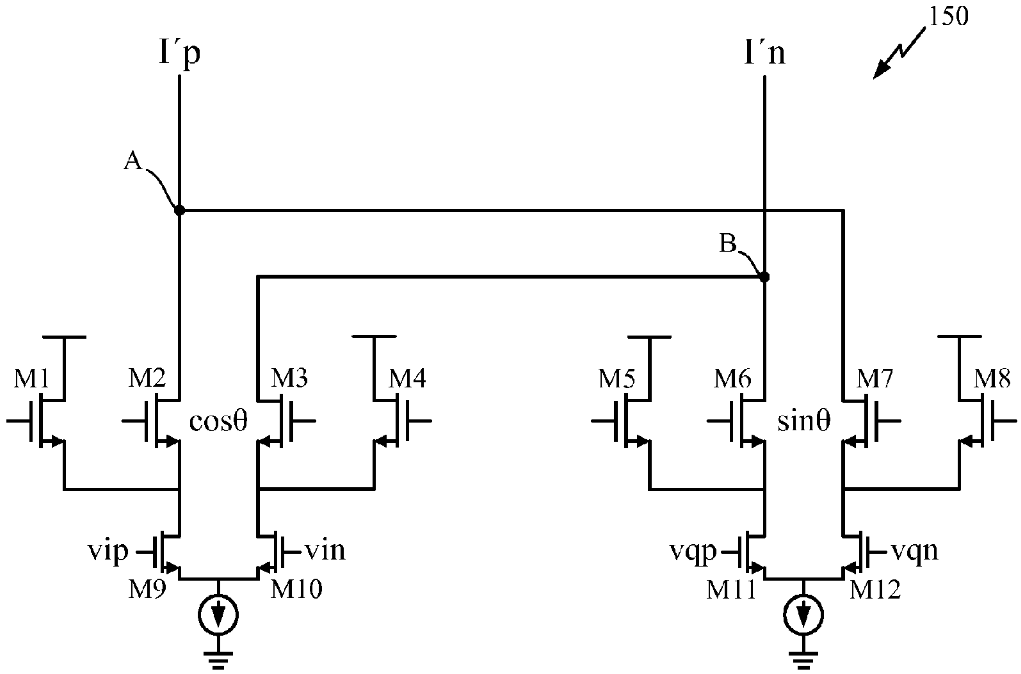
FIG. 4 is a circuit diagram of a phase shifter topology, in accordance with an exemplary embodiment of the present invention.

FIG. 4 depicts a phase shifter 150, according to an exemplary embodiment of the present invention. Phase shifter 150, which is a possible implementation of circuit 100 illustrated in FIG. 3A, includes a plurality of switching elements M1-M12. It is noted that that the phrase "switching element" may also be referred to herein as a "switch." Although switching elements M1-M12 are illustrated in FIG. 4 as transistors, each of switching elements M1-M12 may comprise any known and suitable switching elements. As illustrated in FIG. 4, each of switching elements M1, M4, M5, and M8 have a drain coupled to a ground voltage and a source coupled to a drain of another switching element. Further, each of switching elements M2 and M7 have a drain coupled to a node A and a source coupled to a drain of another switching element. Moreover, each of switching elements M3 and M6 have a drain coupled to a node B and a source coupled to a drain of another switching element. Additionally, each of switching elements M9-M12 have a source coupled to a constant current source. Further, switching element M9 has a drain coupled to each of a source of switching element M1 and a source of switching element M2. Switching element M10 has a drain coupled to each of a source of switching element M3 and a source of switching element M4. Switching element M11 has a drain coupled to each of a source of switching element M5 and a source of switching element M6. Switching element M12 has a drain coupled to each of a source of switching element M7 and a source of switching element M8.

Further, switching elements M1-M12 are each configured to receive a signal at a gate. More specifically, switching elements M1-M8 are each configured to receive a bias voltage (e.g. cos θ or sin θ). A gate of each of switching elements M1-M8 is connected to VDD or GND through the switching element. Switching elements M1-M8 are each configured to achieve the gain function cos θ and sin θ, through switching and selecting different sizes. Additionally, switching element M9 is configured to receive a positive in-phase signal vip at a gate, switching element M10 is configured to receive a negative in-phase signal vin at a gate, switching element M11 is configured to receive a positive quadrature signal vqp at a gate, and switching element M12 is configured to receive a negative quadrature signal vqn at a gate. For example, if θ is 0 degree, which means no phase shift, then cos θ is 1 and sin θ is 0. In this case, switching elements M1, M4, M6, M7 are turned off while switching elements M2, M3, M5, M8 are turned on. As a result, substantially all of the signal current generated by vip and vin may flow to I'p and I'n. Further, the signal current generated by vqp and vqn may not flow to I'p and I'n.

Figure 5:
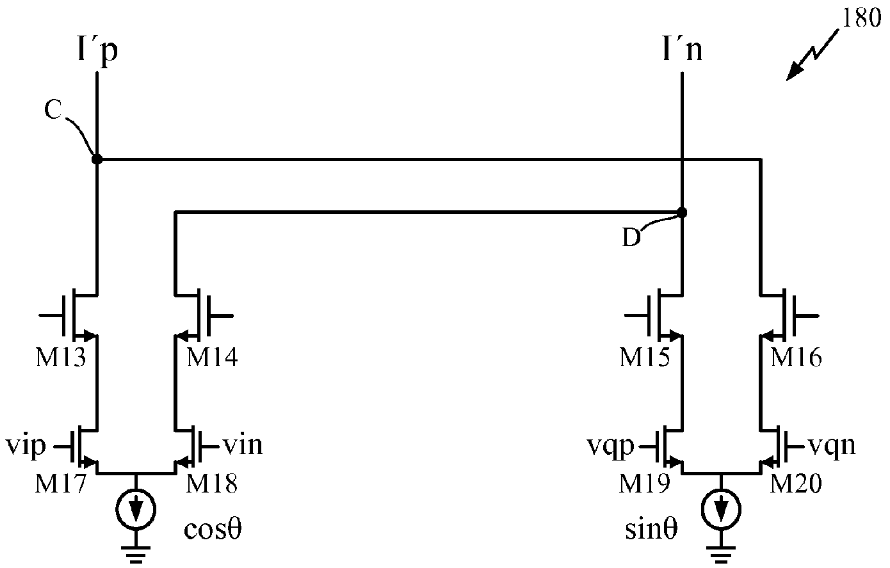
FIG. 5 is a circuit diagram of another phase shifter topology, in accordance with an exemplary embodiment of the present invention.

FIG. 5 depicts a phase shifter 180, according to another exemplary embodiment of the present invention. Phase shifter 180, which is a possible implementation of circuit 120 illustrated in FIG. 3B, includes a plurality of switches M13-M20. Although switching elements M13-M20 are illustrated in FIG. 5 as transistors, each of switching elements M13-M20 may comprise any known and suitable switching elements. As illustrated in FIG. 5, each of switching elements M13 and M16 have a drain coupled to a node C and a source coupled to a drain of another switching element. Further, each of switching elements M14 and M15 have a drain coupled to a node D and a source coupled to a drain of another switching element. Additionally, each of switching elements M17-M20 have a source coupled to a current source (e.g., cos θ or sin θ). Further, switching element M17 has a drain coupled to a source of switching element M13, switching element M18 has a drain coupled to a source of switching element M14, switching element M19 has a drain coupled to a source of switching element M15, and switching element M20 has a drain coupled to a source of switching element M16.

Further, switching elements M13-M16 are each configured to receive a signal at a gate. More specifically, switching elements M13-M16 are each configured to receive constant voltage bias at a gate. Additionally, switching element M17 is configured to receive a positive in-phase signal vip at a gate, switching element M18 is configured to receive a negative in-phase signal vin at a gate, switching element M19 is configured to receive a positive quadrature signal vqp at a gate, and switching element M20 is configured to receive a negative quadrature signal vqn at a gate. For example, if θ is 0 degree, which means no phase shift, then cos θ is 1 and sin θ is 0. In this case, vip and vin may generate signal current while vqp and vqn may not. As a result, the final output I'p and I'n has the substantially the same phase as the vip and vin.

For quadrant selection, as explained more fully below, the following rotation matrices are provided:

$$\text{Quadrant } 1 = \begin{bmatrix} \cos\theta & -\sin\theta \\ \sin\theta & \cos\theta \end{bmatrix}; \tag{9}$$

$$\text{Quadrant } 2 = \begin{bmatrix} -\sin\theta & -\cos\theta \\ \cos\theta & -\sin\theta \end{bmatrix}; \tag{10}$$

$$\text{Quadrant } 3 = \begin{bmatrix} -\cos\theta & \sin\theta \\ -\sin\theta & -\cos\theta \end{bmatrix}; \tag{11}$$

$$\text{Quadrant } 4 = \begin{bmatrix} \sin\theta & \cos\theta \\ -\cos\theta & \sin\theta \end{bmatrix}. \tag{12}$$

Figure 6:
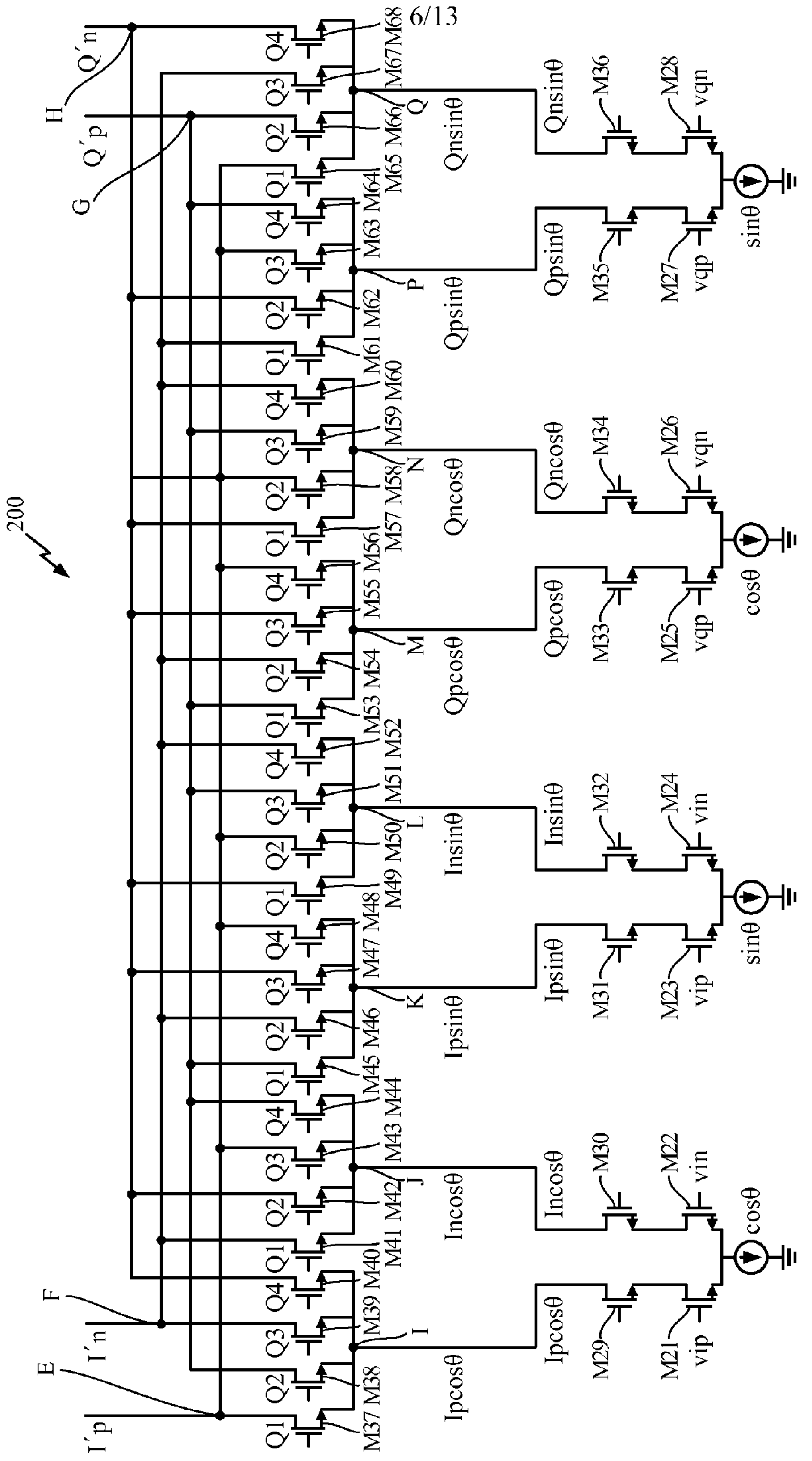
FIG. 6 illustrates a phase shifter, in accordance with an exemplary embodiment of the present invention.

FIG. 6 illustrates a phase shifter 200, according to an exemplary embodiment of the present invention. Phase shifter 200 includes a plurality of switching elements M21-M68. Although the switching elements M21-M68 are illustrated in FIG. 6 as transistors, each of switching elements M21-M68 may comprise any known and suitable switching elements. As illustrated in FIG. 6, each of switching elements M37, M43, M48, M50, M56, M58, M63, and M65 have a drain coupled to a node E, which is also coupled to a first output I'p. Further, each of switching elements M39, M41, M46, M52, M54, M60, M61, and M67 have a drain coupled to a node F, which is also coupled to a second output I'n. Additionally, each of switching elements M38, M44, M45, M51, M53, M59, M64, and M66 have a drain coupled to a node G, which is also coupled to a third output Q'p. Moreover, each of switching elements M40, M42, M47, M49, M55, M57, M62, and M68 have a drain coupled to a node H, which is coupled to a fourth output Q'n.

In addition, each of switching elements M37-M40 have a source coupled to a node I, which is also coupled to a drain of switching element M29. Each of switching elements M41-M44 has a source coupled to a node J, which is also coupled to a drain of switching element M30. Additionally, each of switching elements M45-M48 has a source coupled to a node K, which is also coupled to a drain of switching element M31. Each of switching elements M49-M52 has a source coupled to a node L, which is also coupled to a drain of switching element M32. Each of switching elements M53-M56 has a source coupled to a node M, which is also coupled to a drain of switching element M22. Each of switching elements M57-M60 has a source coupled to a node N, which is also coupled to a drain of switching element M34. Each of switching elements M61-M64 has a source coupled to a node P, which is also coupled to a drain of switching element M34. Further, each of switching elements M65-M68 has a source coupled to a node Q, which is also coupled to a drain of switching element M36. Moreover, each of switching elements M29-M36 have a source coupled to a drain of another switching element and each of switching elements M21-M28 have a drain coupled to a source of another transistor and a source coupled to a current source (i.e., cos θ or sin θ).

Further, switching elements M37-M68, which are utilized for signal selection and combination, are each configured to receive a control signal at a gate. More specifically, switching elements M37, M41, M45, M49, M53, M57, M61, and M65 are each configured to receive a first control signal (e.g., "Q1") at their respective gates, switching elements M38, M42, M46, M50, M54, M58, M62, and M66 are each configured to receive a second control signal (e.g., "Q2") at their respective gates, switching elements M39, M43, M47, M51, M55, M59, M63, and M67 are each configured to receive a third control signal (e.g., "Q3") at their respective gates, and switching elements M40, M44, M48, M52, M56, M60, M64, and M68 are each configured to receive a fourth control signal (e.g., "Q4") at their respective gates.

Additionally, switching elements M21 and M23 are each configured to receive a positive in-phase signal vip at a gate, switching elements M22 and M24 are each configured to receive a signal negative in-phase signal vin at a gate, switching elements M25 and M27 are each configured to receive a positive quadrature signal vqp at a gate, and switching elements M26 and M28 are each configured to receive a negative quadrature signal vqn at a gate. Additionally, switching elements M29-M36 are each configured to receive a constant bias voltage at a gate.

As configured, phase shifter 200 may be configured to select a quadrant, as well as provide for signal combination and rotation. It is noted that one or more quadrants may be selected based on a desired phase shift. As one example, if quadrant one is selected, control signal Q1 is high "1", control signal Q2 is low "0", control signal Q3 is low "0", and control signal Q4 is low "0". Accordingly, if quadrant one is selected, switching elements M37, M41, M45, M49, M53, M57, M61, and M65 are in a conductive state, switching elements M38-M40, M42-M44, M46-M48, M50-M52, M54-M56, M58-M60, M62-M64 are in a non-conductive state, first output I'p is coupled to nodes I and Q, second output I'n is coupled to nodes J and P, third output Q'p is coupled to nodes M and K, and fourth output Q'n is coupled to nodes N and L. As another example, if quadrant two is selected, control signals Q1, Q3, and Q4 are low "0" and control signal Q2 is high "1". Accordingly, if quadrant two is selected, switching elements M38, M42, M46, M50, M54, M58, M62, and M66 are in a conductive state, switching elements M37, M39-M41, M43-M45, M47-M49, M51-M53, M55-M57, M59-M61, M63-M65, M67, and M68 are in a non-conductive state, first output I'p is coupled to nodes L and N, second output I'n is coupled to nodes K and M, third output Q'p is coupled to nodes I and Q, and fourth output Q'n is coupled to nodes J and P.

Further, if quadrant three is selected, control signals Q1, Q2, and Q4 are low "0", and control signal Q3 is high "1". Accordingly, if quadrant three is selected, switching elements M39, M43, M47, M51, M55, M59, M63, and M67 are in a conductive state, switching elements M37, M38, M40-M42, M44-M46, M48-M50, M52-M54, M56-M58, M60-M62, M64-M66, and M68 are in a non-conductive state, first output I'p is coupled to nodes J and P, second output I'n is coupled to nodes I and Q, third output Q'p is coupled to nodes L and N, and fourth output Q'n is coupled to nodes K and M. Moreover, if quadrant four is selected, control signals Q1, Q2, and Q3 are low "0" and control signal Q4 is high "1". Accordingly, if quadrant four is selected, switching elements M40, M44, M48, M52, M56, M60, M64, and M68 are in a conductive state, switching elements M37-M39 M41-M43, M45-M47, M49-M51, M53-M55, M57-M59, M61-M63, and M65-M67 are in a non-conductive state, first output I'p is coupled to nodes K and M, second output I'n is coupled to nodes L and N, third output Q'p is coupled to nodes J and P, and fourth output Q'n is coupled to nodes I and Q.

As will be appreciated by a person having ordinary skill, phase shifter 200 may utilize two digital-to-analog (DAC) converters to generate cos θ or sin θ, wherein θ ranges from substantially zero to ninety degrees. During a contemplated operation of phase shifter 200, phase shifting may be achieved by, for example, using a DAC to generate a required phase shift current, whose magnitude is scaled as cos θ or sin θ. Further, switching elements M21-M68 may be used for signal switching and combing. As a result, a final output is the phase rotated signal as shown in Equation (2) and Equation (3).

Figure 7:
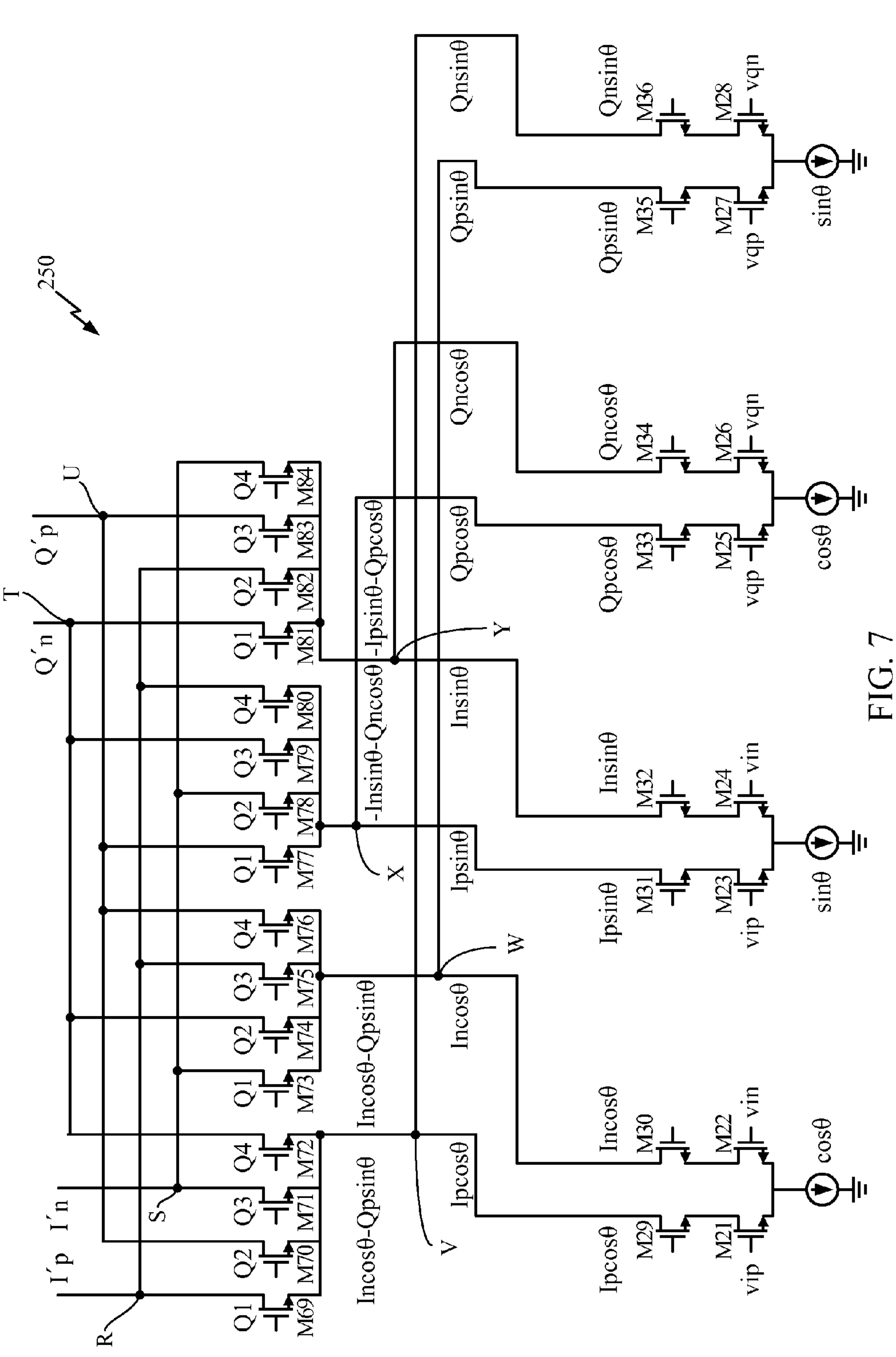
FIG. 7 illustrates another phase shifter, in accordance with an exemplary embodiment of the present invention.

FIG. 7 illustrates another phase shifter 250, in accordance with an exemplary embodiment of the present invention. Phase shifter 250 includes switching elements M21-M36 and M69-M84. Although the switching elements M21-M36 and M69-M84 are illustrated in FIG. 7 as transistors, each of switching elements M21-M36 and M69-M84 may comprise any known and suitable switching elements. As illustrated in FIG. 7, each of switching elements M69, M75, M80, and M82 have a drain coupled to a node R, which is also coupled to a first output I'p. Further, each of switching elements M71, M73, M78, and M84 have a drain coupled to a node S, which is also coupled to a second output I'n. Additionally, each of switching elements M70, M76, M77, and M83 have a drain coupled to a node U, which is coupled to a third output Q'p. Moreover, each of switching elements M72, M74, M79, and M81 have a drain coupled to a node T, which also to coupled to a fourth output Q'n.

In addition, each of switching elements M69-M72 have a source coupled to a node V, which is also coupled to a drain of switching element M29 and a drain of switching element M36. Each of switching elements M73-M76 have a source coupled to a node W, which is also coupled to a drain of switching element M30 and a drain of switching element M35. Additionally, each of switching elements M77-M80 have a source coupled to a node X, which is also coupled to a drain of switching element M31 and a drain of switching element M33. Each of switching elements M81-M84 have a source coupled to a node Y, which is also coupled to a drain of switching element M32 and a drain of switching element M34. Moreover, each of switching elements M29-M36 have a source coupled to a drain of another switching element and each of switching elements M21-M28 have a drain coupled to a source of another transistor and a source coupled to a current source (i.e., cos θ or sin θ).

Further, switching elements M69-M84, which are utilized for signal selection and combination, are each configured to receive a control signal at a gate. More specifically, switching elements M69, M73, M77, and M81 are each configured to receive a first control signal (e.g., "Q1") at their respective gates, switching elements M70, M74, M78, and M82 are each configured to receive a second control signal (e.g., "Q2") at their respective gates, switching elements M71, M75, M79, and M83 are each configured to receive a third control signal (e.g., "Q3") at their respective gates, and switching elements M72, M76, M80, and M84 are each configured to receive a fourth control signal (e.g., "Q4") at their respective gates.

Additionally, switching elements M21 and M23 are each configured to receive a positive in-phase signal vip at a gate, switching elements M22 and M24 are each configured to receive a signal negative in-phase signal vin at a gate, switching elements M25 and M27 are each configured to receive a positive quadrature signal vqp at a gate, and switching elements M26 and M28 are each configured to receive a negative quadrature signal vqn at a gate. Additionally, switching elements M29-M36 are each configured to receive a constant bias voltage at a gate.

As configured, phase shifter 250 may provide for quadrant selection, as well as signal combination and rotation. It is noted that one or more quadrants may be selected based on a desired phase shift. As one example, if quadrant one is selected, control signal Q1 is high "1", control signal Q2 is low "0", control signal Q3 is low "0", and control signal Q4 is low "0". Accordingly, if quadrant one is selected, switching elements M69, M73, M77, and M81 are in a conductive state, switching elements M70-M72, M74-M76, M78-M80, and M82-M84 are in a non-conductive state, first output I'p is coupled to node V, second output I'n is coupled to node W, third output Q'p is coupled to node Y, and fourth output Q'n is coupled to node X. As another example, if quadrant two is selected, control signals Q1, Q3, and Q4 are low "0" and control signal Q2 is high "1". Accordingly, if quadrant two is selected, switching elements M70, M74, M78, and M82 are in a conductive state, switching elements M69, M71-M73, M75-M77, M79-M81, M83, and M84 are in a non-conductive state, first output I'p is coupled to node Y, second output I'n is coupled to node X, third output Q'p is coupled to node V, and fourth output Q'n is coupled to node W.

Further, if quadrant three is selected, control signals Q1, Q2, and Q4 are low "0", and control signal Q3 is high "1". Accordingly, if quadrant three is selected, switching elements M71, M75, M79, and M83 are in a conductive state, switching elements M69, M70, M72-M74, M76-M78, M80-M82, and M84 are in a non-conductive state, first output I'p is coupled to node W, second output I'n is coupled to node V, third output Q'p is coupled to node Y, and fourth output Q'n is coupled to node X. Moreover, if quadrant four is selected, control signals Q1, Q2, and Q3 are low "0" and control signal Q4 is high "1". Accordingly, if quadrant four is selected, switching elements M72, M76, M80, and M84 are in a conductive state, switching elements M69-M71, M73-M75, M77-M79, and M81-M83 are in a non-conductive state, first output I'p is coupled to node X, second output I'n is coupled to node Y, third output Q'p is coupled to node W, and fourth output Q'n is coupled to node V.

As will be appreciated by a person having ordinary skill, phase shifter 250 may utilize two digital-to-analog (DAC) converters to generate cos θ or sin θ, wherein θ ranges from substantially zero to ninety degrees. During a contemplated operation of phase shifter 250, phase shifting may be achieved by, for example, using a DAC to generate a required phase shift current, whose magnitude is scaled as cos θ or sin θ. Further, switching elements M21-M36 and M69-M84 may be used for signal switching and signal combing. As a result, a final output is the phase rotated signal as shown in Equation (2) and Equation (3).

Figure 8:
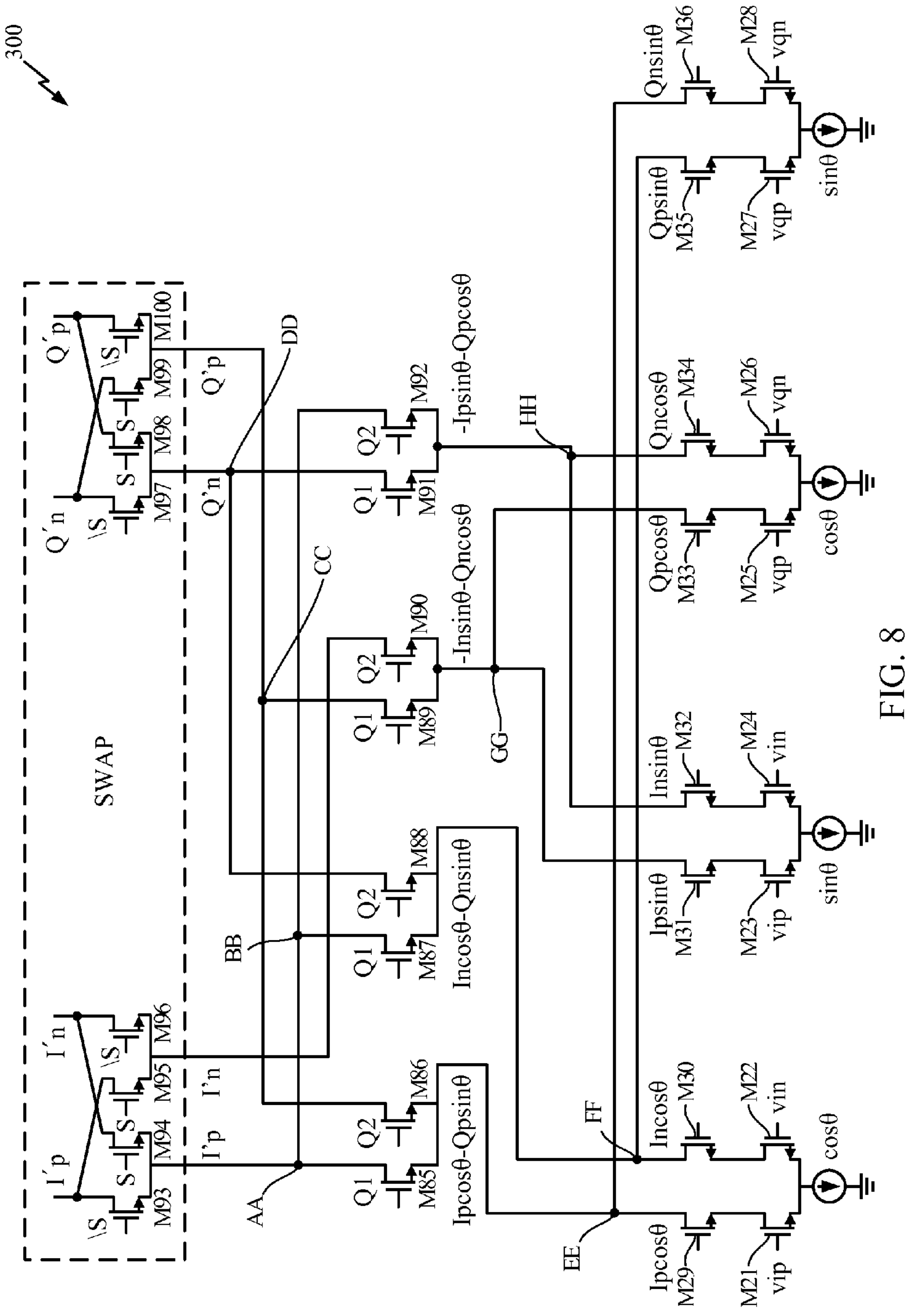
FIG. 8 illustrates yet another phase shifter, in accordance with an exemplary embodiment of the present invention.

FIG. 8 illustrates another phase shifter 300, in accordance with an exemplary embodiment of the present invention. Phase shifter 300 includes switching elements M21-M36 and M85-M100. Although the switching elements M21-M36 and M85-M100 are illustrated in FIG. 8 as transistors, each of switching elements M21-M36 and M85-M100 may comprise any known and suitable switching elements. As illustrated in FIG. 8, each of switching elements M85 and M86 have a source coupled to a node EE, which is coupled to a drain of switching element 29 and a drain of switching element M36. Each of switching elements M87 and M88 have a source coupled to a node FF, which is coupled to a drain of switching element 30 and a drain of switching element M35. Each of switching elements M89 and M90 have a source coupled to a node GG, which is coupled to a drain of switching element 31 and a drain of switching element 33. Further, each of switching elements M91 and M92 have a source coupled to a node HH, which is coupled to a drain of switching element 32 and a drain of switching element 34.

In addition, each of switching elements M85 and M92 have a drain coupled to a node AA, which is also coupled to a source of switching element M93 and a source of switching element M94. Each of switching elements M87 and M90 have a drain coupled to a node BB, which is also coupled to a source of switching element M95 and a source of switching element M96. Additionally, each of switching elements M86 and M89 have a drain coupled to a node CC, which is also coupled to a source of switching element M99 and a source of switching element M100. Moreover, each of switching elements M88 and M91 have a drain coupled to a node DD, which is also coupled to a source of switching element M97 and a source of switching element M98.

Moreover, switching elements M93 and M95 have a drain coupled to a first output I'p and switching elements M94 and M96 have a drain coupled to a second output I'n. Moreover, switching elements M98 and M100 have a drain coupled to a third output Q'p and switching elements M97 and M99 have a drain coupled to a fourth output Q'n.

Further, switching elements M85-M100 are each configured to receive a control signal at a gate. More specifically, switching elements M85, M87, M89, and M91 are each configured to receive a first control signal (e.g., "Q1") at their respective gates, switching elements M86, M88, M90, and M92 are each configured to receive a second control signal (e.g., "Q2") at their respective gates, switching elements M93, M96, M97, and M100 are each configured to receive a third control signal (e.g., "\S") at their respective gates, and switching elements M94, M95, M98, and M99 are each configured to receive a fourth control signal (e.g., "S") at their respective gates. It is noted that switching elements M85-M92 are utilized for signal selection and combination and switching elements M93-M100 are utilized for output selection.

Additionally, switching elements M21 and M23 are each configured to receive a positive in-phase signal vip at a gate, switching elements M22 and M24 are each configured to receive a signal negative in-phase signal vin at a gate, switching elements M25 and M27 are each configured to receive a positive quadrature signal vqp at a gate, and switching elements M26 and M28 are each configured to receive a negative quadrature signal vqn at a gate. Additionally, switching elements M29-M36 are each configured to receive a constant bias voltage at a gate.

As configured, phase shifter 300 may be configured for quadrant selection, as well as provide for signal combination and rotation. It is noted that one or more quadrants may be selected based on a desired phase shift. As one example, if quadrant one is selected, control signal Q1 is high "1", control signal Q2 is low "0", control signal S is low "0", and control signal \S is high "1". Accordingly, if quadrant one is selected, switching elements M85, M87, M89, M91, M93, M96, M97, and M100 are in a conductive state, switching elements M86, M88, M90, M92, M94, M95, M98, and M99 are in a non-conductive state, first output I'p is coupled to node AA, second output I'n is coupled to node BB, third output Q'p is coupled to node CC, and fourth output Q'n is coupled to node DD. As another example, if quadrant two is selected, control signal Q1 is low "0", control signal Q2 is high "1", control signal S is low "0", and control signal \S is high "1". Accordingly, if quadrant two is selected, switching elements M85, M87, M89, M91, M94, M95, M98, and M99 are in a non-conductive state, switching elements M86, M88, M90, M92, M93, M96, M97, and M100 are in a conductive state, first output I'p is coupled to node AA, second output I'n is coupled to node BB, third output Q'p is coupled to node DD, and fourth output Q'n is coupled to node DD.

Further, if quadrant three is selected, control signal Q1 is high "1", control signal Q2 is low "0", control signal S is high "1", and control signal \S is low "0". Accordingly, if quadrant three is selected, switching elements M85, M87, M89, M91, M94, M95, M98, and M99 are in a conductive state, switching elements M86, M88, M90, M92, M93, M96, M97, and M100 are in a non-conductive state, first output I'p is coupled to node BB, second output I'n is coupled to node AA, third output Q'p is coupled to node DD, and fourth output Q'n is coupled to node CC. Moreover, if quadrant four is selected, control signal Q1 is low "0", control signal Q2 is high "1", control signal S is high "1", and control signal \S is low "0". Accordingly, if quadrant four is selected, switching elements M85, M87, M89, M91, M93, M96, M97, and M100 are in a non-conductive state, switching elements M86, M88, M90, M92, M94, M95, M98, and M99 are in a conductive state, first output I'p is coupled to node BB, second output I'n is coupled to node AA, third output Q'p is coupled to node DD, and fourth output Q'n is coupled to node CC.

As will be appreciated by a person having ordinary skill, phase shifter 250 may utilize two digital-to-analog (DAC) converters to generate cos θ or sin θ, wherein θ ranges from substantially zero to ninety degrees. During a contemplated operation of phase shifter 300, phase shifting may be achieved by, for example, using a DAC to generate a required phase shift current, whose magnitude is scaled as cos θ or sin θ. Further, switching elements M21-M36 and M85-M100 may be used for signal switching and combing. As a result, a final output is the phase rotated signal as shown in Equation (2) and Equation (3).

It is noted that in comparison to phase shifter 200 illustrated in FIG. 6, phase shifter 250 illustrated in FIG. 7 and phase shifter 300 illustrated in FIG. 7 have a reduced number of switching elements and, therefore, the parasitic capacitance may be reduced. It is further noted that phase shifters 200, 250, and 300 respectively illustrated in FIGS. 6, 7, and 8 may be configured for high resolution cases (e.g., above ninety degrees). However, in some cases, resolution greater than ninety degrees may not be required and, thus, a simplified architecture may be utilized.

Figure 9:
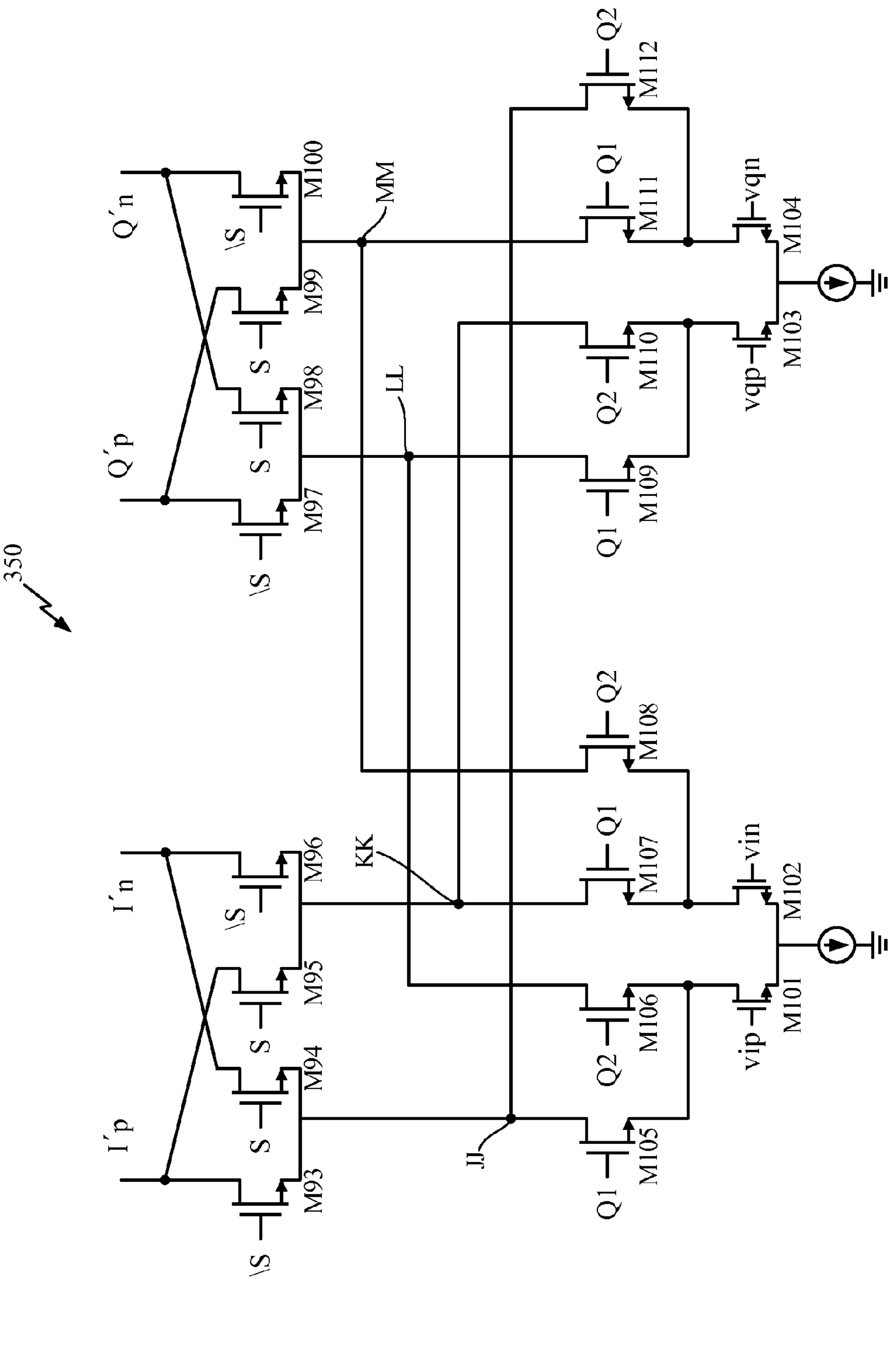
FIG. 9 illustrates a phase shifter for ninety degree resolution, in accordance with an exemplary embodiment of the present invention.

FIG. 9 illustrates another phase shifter 350, in accordance with an exemplary embodiment of the present invention. Although phase shifter 350 is not limited to cases wherein a resolution of ninety degrees or less is desired, phase shifter 350 provides for simplified circuitry in cases that do not require a resolution greater than ninety degrees.

Phase shifter 350 includes switching elements M93-M112. Although the switching elements M93-M112 are illustrated in FIG. 9 as transistors, each of switching elements M93-M112 may comprise any known and suitable switching elements. As illustrated in FIG. 9, each of switching elements M105 and M112 have a drain coupled to a node JJ, which is coupled to a source of switching element M93 and a source of switching element M94. Further, each of switching elements M107 and M110 have a drain coupled to a node KK, which is coupled to a source of switching element M95 and a source of switching element M96. Additionally, each of switching elements M106 and M109 have a drain coupled to a node LL, which is coupled to a source of switching element M97 and a source of switching element M98. Moreover, each of switching elements M108 and M111 have a drain coupled to a node MM, which is coupled to a source of switching element M99 and a source of switching element M100.

In addition, each of switching elements M105 and M106 have a source coupled to a drain of switching element M101. Each of switching elements M107 and M108 have a source coupled to a drain of switching element M102. Additionally, each of switching elements M109 and M110 have a source coupled to a drain of switching element M103. Each of switching elements M111 and M112 have a source coupled to a drain of switching element M104. Moreover, each of switching elements M101-M104 have a drain coupled to a source of another switching element and a source coupled to a constant current source. Further, switching elements M93 and M95 have a drain coupled to a first output I'p and switching elements M94 and M96 have a drain coupled to a second output I'n. Moreover, switching elements M97 and M99 have a drain coupled to a third output Q'p and switching elements M98 and M100 have a drain coupled to a fourth output Q'n.

Further, switching elements M93-M100 and M105-M112 are each configured to receive a control signal at a gate. More specifically, switching elements M105, M107, M109, and M111 are each configured to receive a first control signal (e.g., "Q1") at their respective gates, switching elements M106, M108, M110, and M112 are each configured to receive a second control signal (e.g., "Q2") at their respective gates, switching elements M93, M96, M97, and M100 are each configured to receive a third control signal (e.g., "\S") at their respective gates, and switching elements M94, M95, M98, and M99 are each configured to receive a fourth control signal (e.g., "S") at their respective gates.

Additionally, switching element M101 is configured to receive a positive in-phase signal vip at a gate, switching element M102 is configured to receive a negative in-phase signal vin at a gate, switching element M103 is configured to receive a positive quadrature signal vqp at a gate, and switching element M104 is configured to receive a negative quadrature signal vqn at a gate.

As configured, phase shifter 350 may enable for quadrant selection, as well as provide for signal combination and rotation. It is noted that one or more quadrants may be selected based on a desired phase shift. As one example, if quadrant one is selected, control signal Q1 is high "1", control signal Q2 is low "0", control signal S is low "0", and control signal \S is high "1". Accordingly, if quadrant one is selected, switching elements M105, M107, M109, M111, M93, M96, M97, and M100 are in a conductive state, switching elements M106, M108, M110, M112, M94, M95, M98, and M99 are in a non-conductive state, first output I'p is coupled to node JJ, second output I'n is coupled to node KK, third output Q'p is coupled to node LL, and fourth output Q'n is coupled to node MM. As another example, if quadrant two is selected, control signal Q1 is low "0", control signal Q2 is high "1", control signal S is low "0", and control signal \S is high "1". Accordingly, if quadrant two is selected, switching elements M105, M107, M109, M111, M94, M95, M98, and M99 are in a non-conductive state, switching elements M106, M108, M110, M112, M93, M96, M97, and M100 are in a conductive state, first output I'p is coupled to node JJ, second output I'n is coupled to node KK, third output Q'p is coupled to node LL, and fourth output Q'n is coupled to node MM.

Further, if quadrant three is selected, control signal Q1 is high "1", control signal Q2 is low "0", control signal S is high "1", and control signal \S is low "0". Accordingly, if quadrant three is selected, switching elements M105, M107, M109, M111, M94, M95, M98, and M99 are in a conductive state, switching elements M106, M108, M110, M112, M93, M96, M97, and M100 are in a non-conductive state, first output I'p is coupled to node KK, second output I'n is coupled to node JJ, third output Q'p is coupled to node MM, and fourth output Q'n is coupled to node LL. Moreover, if quadrant four is selected, control signal Q1 is low "0", control signal Q2 is high "1", control signal S is high "1", and control signal \S is low "0". Accordingly, if quadrant four is selected, switching elements M105, M107, M109, M111, M93, M96, M97, and M100 are in a non-conductive state, switching elements M106, M108, M110, M112, M94, M95, M98, and M99 are in a conductive state, first output I'p is coupled to node KK, second output I'n is coupled to node JJ, third output Q'p is coupled to node MM, and fourth output Q'n is coupled to node LL.

Figure 10:
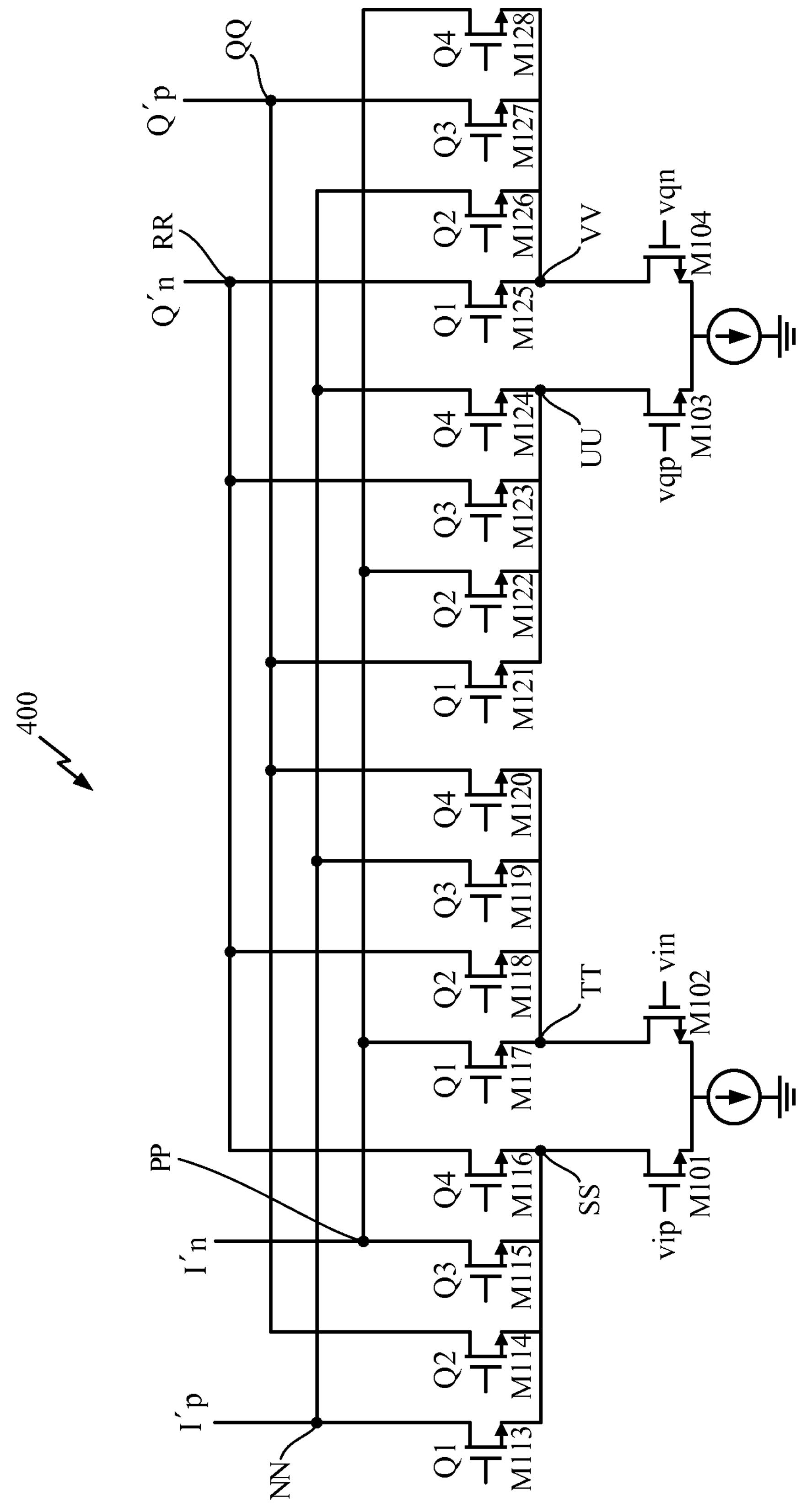
FIG. 10 illustrates yet another phase shifter for ninety degree resolution, in accordance with an exemplary embodiment of the present invention.

FIG. 10 illustrates another phase shifter 400, in accordance with an exemplary embodiment of the present invention. Although phase shifter 400 is not limited to cases wherein a resolution of ninety degrees or less is desired, phase shifter 400 provides for simplified circuitry in cases that do not require a resolution greater than ninety degrees.

Phase shifter 400 includes switching elements M101-M104 and M113-M128. Although the switching elements M101-M104 and M113-M128 are illustrated in FIG. 10 as transistors, each of switching elements M101-M104 and M113-M128 may comprise any known and suitable switching elements. As illustrated in FIG. 10, each of switching elements M113, M119, M124, and M126 have a drain coupled to a node NN, which is coupled to first output I'p. Further, each of switching elements M115, M117, M122, and M128 have a drain coupled to a node PP, which is coupled to second output I'n. Additionally, each of switching elements M114, M120, M121, and M127 have a drain coupled to a node QQ, which is coupled to third output Q'p. Additionally, each of switching elements M116, M118, M123, and M125 have a drain coupled to a node RR, which is coupled to fourth output Q'n.

In addition, each of switching elements M113-M116 has a source coupled to a drain of switching element M101. Each of switching elements M117-M120 has a source coupled to a drain of switching element M102. Each of switching elements M121-M124 has a source coupled to a drain of switching element M103. Further, each of switching elements M125-M128 has a source coupled to a drain of switching element M104. Moreover, each of switching elements M101-M104 have a drain coupled to a source of another switching element and a source coupled to a constant current source.

Further, switching elements M113-M128 are each configured to receive a control signal at a gate. More specifically, switching elements M113, M117, M121, and M125 are each configured to receive a first control signal (e.g., "Q1") at their respective gates, switching elements M114, M118, M122, and M126 are each configured to receive a second control signal (e.g., "Q2") at their respective gates, switching elements M115, M119, M123, and M1127 are each configured to receive a third control signal (e.g., "Q3") at their respective gates, and switching elements M116, M120, M124, and M128 are each configured to receive a fourth control signal (e.g., "Q4") at their respective gates.

Additionally, switching element M101 is configured to receive a positive in-phase signal vip at a gate, switching element M102 is configured to receive a negative in-phase signal vin at a gate, switching element M103 is configured to receive a positive quadrature signal vqp at a gate, and switching element M104 is configured to receive a negative quadrature signal vqn at a gate.

As configured, phase shifter 400 may enable for quadrant selection, as well as provide for signal combination and rotation. It is noted that one or more quadrants may be selected based on a desired phase shift. As one example, if quadrant one is selected, control signal Q1 is high "1", control signal Q2 is low "0", control signal Q3 is low "0", and control signal Q4 is low "0". Accordingly, if quadrant one is selected, switching elements M113, M117, M121, and M125 are in a conductive state, switching elements M114-M116, M118-M120, M122-M124, and M126-M128 are in a non-conductive state, first output I'p is coupled to a node SS, second output I'n is coupled to a node TT, third output Q'p is coupled to node UU, and fourth output Q'n is coupled to node VV. As another example, if quadrant two is selected, control signal Q1 is low "0", control signal Q2 is high "1", control signal Q3 is low "0", and control signal Q4 is low "0". Accordingly, if quadrant two is selected, switching elements M113, M115-M117, M119-M121, M123-M125, M127, and M128 are in a non-conductive state, switching elements M114, M118, M122, and M126 are in a conductive state, first output I'p is coupled to node VV, second output I'n is coupled to node UU, third output Q'p is coupled to node SS, and fourth output Q'n is coupled to node TT.

Further, if quadrant three is selected, control signal Q1 is low "0", control signal Q2 is low "0", control signal Q3 is high "1", and control signal Q4 is low "0". Accordingly, if quadrant three is selected, switching elements M113, M114, M116-M118, M120-M122, M124-M126, and M128 are in a non-conductive state, switching elements M115, M119, M123, and M1127 are in a conductive state, first output I'p is coupled to node TT, second output I'n is coupled to node SS, third output Q'p is coupled to node VV, and fourth output Q'n is coupled to node UU. Moreover, if quadrant four is selected, control signal Q1 is low "0", control signal Q2 is low "0", control signal Q3 is low "0", and control signal Q4 is high "1". Accordingly, if quadrant four is selected, switching elements M113-M115, M117-M119, M121-M123, and M125-M127 are in a non-conductive state, switching elements M116, M120, M124, and M128 are in a conductive state, first output I'p is coupled to node UU, second output I'n is coupled to node VV, third output Q'p is coupled to node TT, and fourth output Q'n is coupled to node SS.

Phase shifter 350 and phase shifter 400 are cases wherein the phase resolution is 90 degrees. Under this condition, at 0 degrees, I=I' and Q=Q', at 90 degrees, I'=−Q and Q'=I, at 180 degrees, I'=−I and Q'=−Q, and at 270 degrees, I'=Q and Q'=−I. As a result, accurate DACs may be used to generate the scaled current of cos and sin because sin 90, sin 180, sin 0 sin 360, cos 90, cos 0, cos 180, and cos 270 are 0, 1 or −1. Since only 0, 1 or −1 are required, the phase shifting procedure is simpler as only one step is needed. Depending on the quadrant, Q1, Q2 Q3, or Q4 can be selected. The final output is the phase rotated signal as shown in Equation (2) and Equation (3). It is noted that, in certain cases, two quadrant signals may be turned on to achieve 45 degrees. For example, Q1=0 degrees, Q2=90 degrees, Q3=180 degrees, and Q4=270 degrees. In addition, if Q1 and Q2 are both turned on, 45 degrees may be achieved. If Q2 and Q3 are both turned on, 135 degrees may be achieved. Moreover, if Q3 and Q4 are both turned on, 225 degrees may be achieved. Additionally, if Q4 and Q1 are both turned on, 315 degrees may be achieved.

Figure 11:
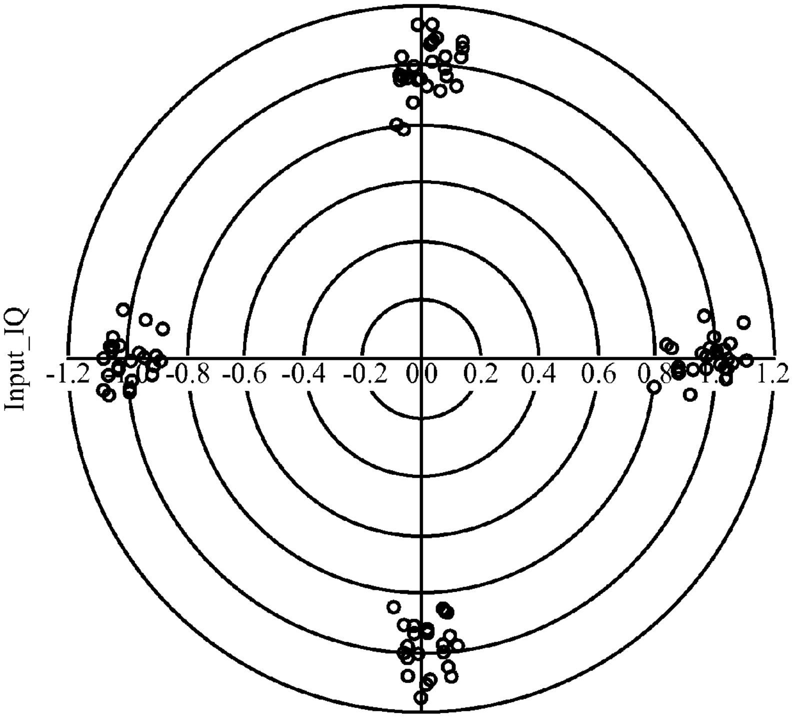
FIG. 11 is a plot depicting in-phase and quadrature data prior to being rotated.
Figure 12:
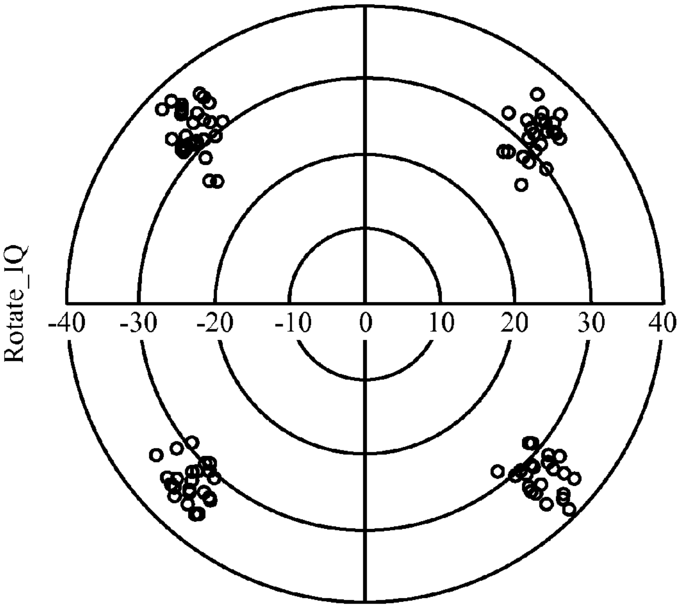
FIG. 12 is a plot depicting the in-phase and quadrature data of FIG. 11, after being rotated forty-five degrees.
Figure 13:
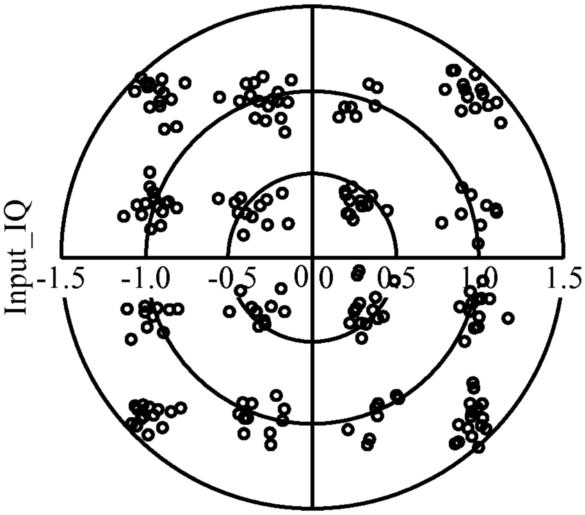
FIG. 13 is a plot depicting in-phase and quadrature data prior to being rotated.
Figure 14:
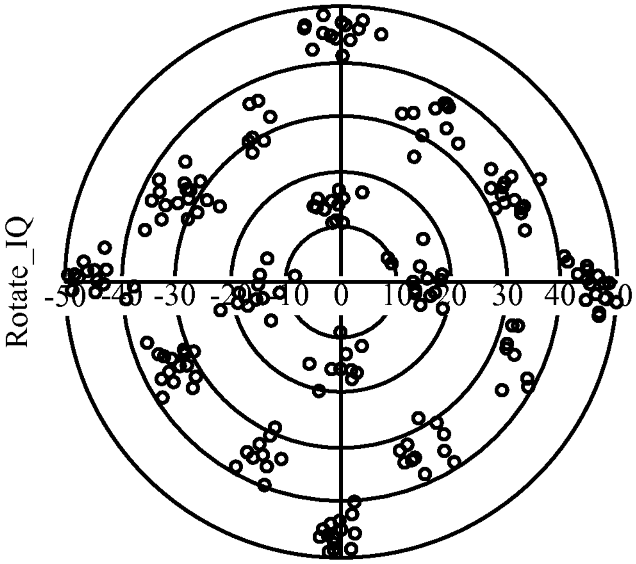
FIG. 14 is a plot depicting the in-phase and quadrature data of FIG. 13, after being rotated forty-five degrees.

FIG. 11 is a plot depicting in-phase and quadrature (I/Q) data prior to being rotated. FIG. 12 is a plot depicting the in-phase and quadrature data of FIG. 11, after being rotated forty-five degrees. FIG. 13 is a plot depicting in-phase and quadrature data prior to being rotated. FIG. 14 is a plot depicting the in-phase and quadrature data of FIG. 13, after being rotated forty-five degrees. It is noted that FIGS. 11 and 12 represent I/Q data associated with QPSK modulation and FIGS. 13 and 14 represent I/Q data associated with 16-QAM modulation.

Figure 15:
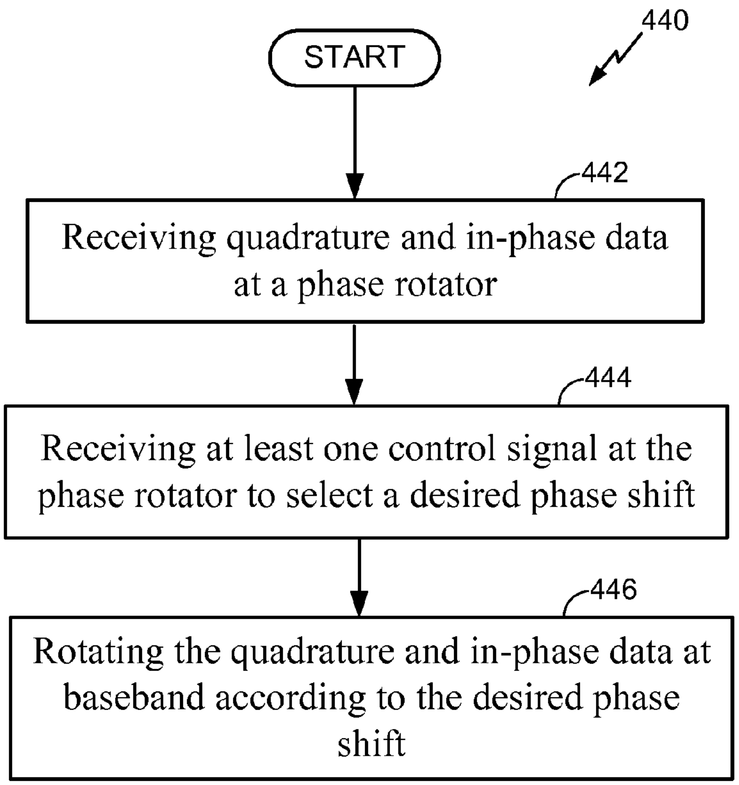
FIG. 15 is a flowchart illustrating a method, according to an exemplary embodiment of the present invention.

FIG. 15 is a flowchart illustrating a method 440, in accordance with one or more exemplary embodiments. Method 440 may include receiving quadrature and in-phase data at a phase rotator (depicted by numeral 442). Method 440 may also include receiving at least one control signal at the phase rotator to select a desired phase shift (depicted by numeral 444). Further, method 440 may include rotating the quadrature and in-phase data at baseband according to the desired phase shift (depicted by numeral 446).

Figure 16:
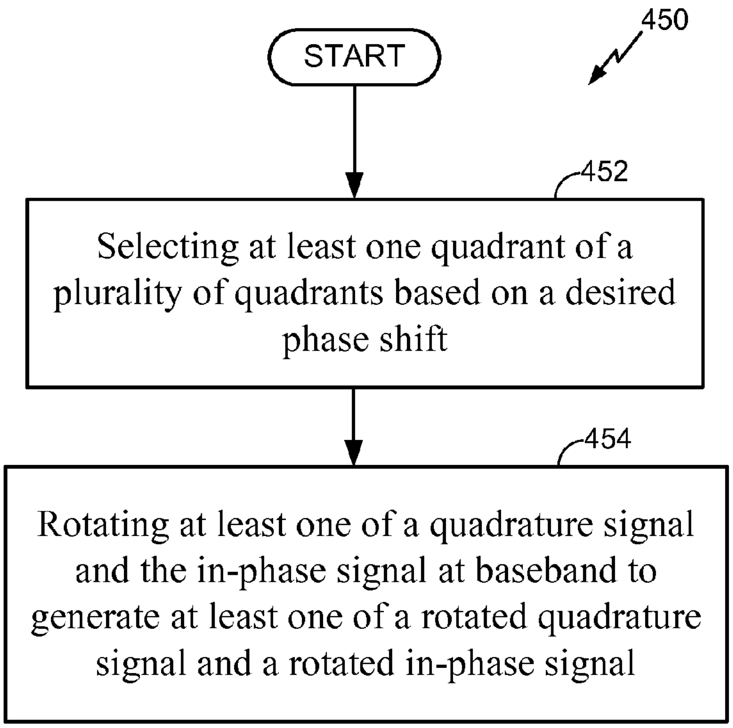
FIG. 16 is a flowchart illustrating another method, according to an exemplary embodiment of the present invention.

FIG. 16 is a flowchart illustrating another method 450, in accordance with one or more exemplary embodiments. Method 450 may include selecting at least one quadrant of a plurality of quadrants based on a desired phase shift (depicted by numeral 452). Further, method 450 may include rotating at least one of a quadrature signal and the in-phase signal at baseband to generate at least one of a rotated quadrature signal and a rotated in-phase signal (depicted by numeral 454).

Exemplary embodiments, as described herein, may be suitable for various modulation techniques including, but not limited to, QPSK, 16-QAM, and 64-QAM. Further, embodiments of the present invention may be suitable for double side balanced mixers or single side balance mixers. Further, exemplary embodiments of the present invention, which are suitable for transmitter and receivers implementations, are capable of providing 360 degree coverage. As described above, digitally controlled switches may be used for phase combining and rotating, and quadrant selection may be based on a desired total phase shift.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:

a plurality of inputs for receiving differential in-phase and quadrature data; and a plurality of switching elements coupled to the plurality of inputs and configured to enable rotation of the differential in-phase and quadrature data at baseband by combining currents from a plurality of current sources.

2. The device of claim 1, the plurality of inputs comprising a second plurality of switching elements.

3. The device of claim 1, further comprising another plurality of switches coupled to the plurality of switching elements for outputting rotated differential in-phase and quadrature data.

4. The device of claim 1, further comprising at least one digital-to-analog converter coupled to the plurality of inputs for generating a variable current source.

5. The device of claim 1, further comprising a constant current source coupled to the plurality of inputs.

6. The device of claim 1, further comprising another plurality of inputs coupled to the plurality of inputs, each input of the another plurality of inputs configured for receiving a constant voltage bias.

7. The device of claim 6, each switch of the plurality of switches configured to receive a digital control signal.

8. A device, comprising:

a plurality of mixers for conveying differential in-phase and quadrature signals;

at least one phase rotator configured to receive the differential in-phase and quadrature signals and comprising:

a plurality of switching elements configured to enable rotation of the differential in-phase and quadrature signals at baseband by combining currents from a plurality of current sources; and the plurality of current sources coupled to the plurality of switches.

9. The device of claim 8, the plurality of current sources comprising constant current sources.

10. The device of claim 8, the plurality of current sources comprising a plurality of variable current sources generated by a digital-to-analog converter.

11. The device of claim 8, each switch of the first plurality of switches and the second plurality of switches comprising a transistor.

12. The device of claim 8, the plurality of switching elements comprising a plurality of transistors, each transistor configured to receive a control signal for selection of a desired quadrant.

13. The device of claim 8, each switch of the second plurality of switches coupled to a digital-to-analog converter.

14. A phase rotator, comprising:

a plurality of inputs for receiving differential in-phase and quadrature data; and a plurality of switching elements to enable rotation of the differential in-phase and quadrature data at baseband by combining currents from a plurality of current sources.

15. The phase rotator of claim 14, the plurality of switching elements comprising a first plurality of transistors for receiving a plurality of input signals and a second plurality of transistors for selecting a desired phase shift.

16. The phase rotator of claim 15, the plurality of switching elements further comprising a third plurality of transistors for conveying rotated in-phase and quadrature data.

17. A method, comprising:

receiving quadrature and in-phase data at a phase rotator; and receiving at least one control signal at the phase rotator to select a desired phase shift; and rotating the quadrature and in-phase data at baseband according to the desired phase shift by combining currents from a plurality of current sources.

18. The method of claim 17, the receiving at least one control signal comprising receiving a control signal at one or more switches to select the desired phase shift.

19. The method of claim 17, the receiving quadrature and in-phase data comprising receiving a first differential in-phase signal at at least one first switch, a second differential in-phase signal at at least one second switch, a first differential quadrature signal at at least one third switch, and a second differential quadrature signal at at least one fourth switch.

20. A method, comprising:

selecting by a controller at least one quadrant of a plurality of quadrants based on a desired phase shift; and rotating at least one of a quadrature signal and the in-phase signal at baseband to generate at least one of a rotated quadrature signal and a rotated in-phase signal by combining currents from a plurality of current sources.

21. The method of claim 20, the selecting comprising conveying a signal to at least one switch of a plurality of switches to select the at least one quadrant.

22. The method of claim 20, further comprising generating one or more variable current sources with at least one digital-to-analog converter.

23. The method of claim 20, the rotating comprising conveying a control signal to at least one switch of a plurality of switches for selecting one or more output signals comprising the rotated quadrature signal or the rotated in-phase signal.

24. A device, comprising:

means for receiving quadrature and in-phase data at a phase rotator; and means for rotating the quadrature and in-phase data at baseband according to the desired phase shift by combining currents from a plurality of current sources.

25. A device, comprising:

means for selecting at least one quadrant of a plurality of quadrants based on a desired phase shift; and means for rotating at least one of a quadrature signal and the in-phase signal at baseband to generate at least one of a rotated quadrature signal and a rotated in-phase signal by combining currents from a plurality of current sources.

* * * * *